United States Patent
Vander Lind et al.

(10) Patent No.: US 9,205,920 B2
(45) Date of Patent: Dec. 8, 2015

(54) WIRING HARNESS FOR AN AERIAL VEHICLE

(71) Applicant: Google Inc., Mountain View, CA (US)

(72) Inventors: Damon Vander Lind, Alameda, CA (US); Eric Chin, Mountain View, CA (US); Kurt Hallamasek, San Carlos, CA (US)

(73) Assignee: Google Inc., Mountain View, CA (US)

(*) Notice: Subject to any disclaimer, the term of this patent is extended or adjusted under 35 U.S.C. 154(b) by 82 days.

(21) Appl. No.: 14/143,543

(22) Filed: Dec. 30, 2013

(65) Prior Publication Data

US 2015/0183515 A1 Jul. 2, 2015

(51) Int. Cl.
*B64C 39/02* (2006.01)
*H02G 3/04* (2006.01)

(52) U.S. Cl.
CPC .............. *B64C 39/02* (2013.01); *H02G 3/0406* (2013.01)

(58) Field of Classification Search
CPC .............................. B64C 39/02; H02G 3/0406
USPC ....................................... 244/118.1, 120, 115
See application file for complete search history.

(56) References Cited

U.S. PATENT DOCUMENTS

| | | | |
|---|---|---|---|
| 6,457,943 B1 | 10/2002 | Olsen et al. | |
| 7,234,667 B1* | 6/2007 | Talmage, Jr. | 244/120 |
| 8,191,255 B2 | 6/2012 | Kristensen et al. | |
| 8,289,672 B2 | 10/2012 | Dahl et al. | |
| 8,517,681 B2 | 8/2013 | Naka et al. | |
| 2010/0047070 A1 | 2/2010 | Slot | |
| 2010/0123042 A1* | 5/2010 | Ballard et al. | 244/118.1 |
| 2012/0003094 A1 | 1/2012 | Hansen | |
| 2012/0103685 A1* | 5/2012 | Blanchard et al. | 174/72 A |
| 2012/0141277 A1 | 6/2012 | Yarbrough et al. | |
| 2012/0315147 A1 | 12/2012 | Rindt | |
| 2012/0325553 A1* | 12/2012 | Ito et al. | 174/74 R |

FOREIGN PATENT DOCUMENTS

WO WO 9424729 A1 10/1994

OTHER PUBLICATIONS

International Search Report for PCT/US2014/071902 mailed Mar. 25, 2015.

* cited by examiner

*Primary Examiner* — Justin Benedik
(74) *Attorney, Agent, or Firm* — McDonnell Boehnen Hulbert & Berghoff LLP

(57) ABSTRACT

Systems and methods are provided for a wiring harness for an aerial vehicle. A wing of the aerial vehicle comprises a pocket for insertion of the wiring harness. The wiring harness provides wiring and associated connections capable to attach to and power various components.

15 Claims, 8 Drawing Sheets

WIRING HARNESS FOR AN AERIAL VEHICLE

BACKGROUND

Unless otherwise indicated herein, the materials described in this section are not prior art to the claims in this application and are not admitted to be prior art by inclusion in this section.

Wind is a source of renewable energy. Traditionally, wind energy has been used to tow watercraft or land craft via use of a sail. However, the sail is typically located close to the earth surface and does not take advantage of the stronger wind at higher altitudes. Aerial vehicles may be used to extract power from wind at such higher altitudes to turn a generator. Such aerial vehicles comprise one or more wings with circuitry to communicate power to various components.

SUMMARY

Systems and methods for providing a wiring harness for an aerial vehicle are described herein. Embodiments described herein provide wiring to power components on a harness that is attached to a wing of an aerial vehicle. By removing the need to form holes or the like through the wing's protective outer layer to provide such wiring, such a harness may maintain a wing's integrity and thus prolong the useful life of the wing.

In one example embodiment, a wiring harness attachable to a wing of an aerial vehicle is provided. The wiring harness comprises a body, one or more wires embedded into a cable in the body, and one or more connectors in communication with the one or more wires and partially embedded in the body. The connectors may be attached to pylons and/or various components to power the components.

In another example embodiment, a system may be provided that comprises an aerial vehicle with a wing and a wiring harness attached to the wing. The wing may include a pocket for insertion of the wiring harness. The pocket may be formed as a recessed section of the wing.

In one aspect, a method may involve manufacturing such a wiring harness. The method may include stripping an insulating layer from a segment of one or more wires, attaching the stripped segment of the one or more wires to a connector, forming a protective layer over a portion of the connector, molding a harness body around the one or more wires and the connector, and removing the protective layer to leave the portion of the connector exposed.

These as well as other aspects, advantages, and alternatives, will become apparent to those of ordinary skill in the art by reading the following detailed description, with reference where appropriate to the accompanying drawings.

DETAILED DESCRIPTION

Figure 1:
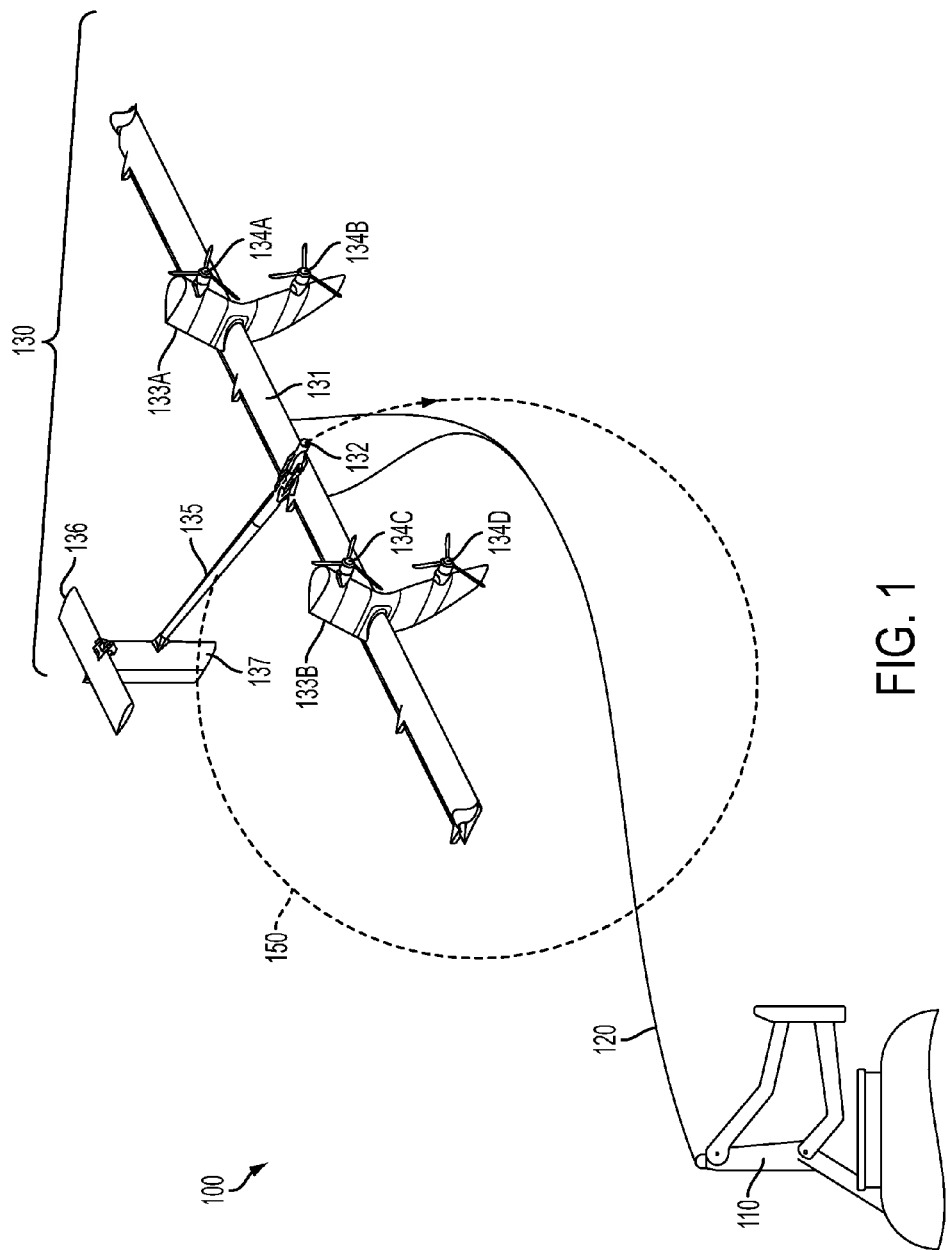
FIG. 1 depicts an Airborne Wind Turbine (AWT), according to an example embodiment.

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed methods systems and can be arranged and combined in a wide variety of different configurations, all of which are contemplated herein.

I. OVERVIEW

Illustrative embodiments relate to aerial vehicles, which may be used in a wind energy system, such as an Airborne Wind Turbine (AWT). In particular, illustrative embodiments may relate to or take the form of a wiring harness that is attachable to an aerial vehicle.

By way of background, an AWT may include an aerial vehicle that flies in a path, such as a substantially circular path, to convert kinetic wind energy to electrical energy. In an illustrative implementation, the aerial vehicle may be connected to a ground station via a tether. While tethered, the aerial vehicle can: (i) fly at a range of elevations and substantially along the path, and return to the ground, and (ii) transmit electrical energy to the ground station via the tether. (In some implementations, the ground station may transmit electricity to the aerial vehicle for take-off and/or landing.)

In an AWT, an aerial vehicle may rest in and/or on a ground station (or perch) when the wind is not conducive to power generation. When the wind is conducive to power generation, such as when a wind speed may be 3.5 meters per second (m/s) at an altitude of 200 meters (m), the ground station may deploy (or launch) the aerial vehicle. In addition, when the aerial vehicle is deployed and the wind is not conducive to power generation, the aerial vehicle may return to the ground station.

AWTs have similarities with both aircraft and wind turbines. Like an aircraft, AWTs have significant wiring requirements. Yet AWTs also must operate in similar a material fatigue environment to wind turbines. Thus, although aircraft typically have holes in a wing to install wiring, such holes may be susceptible to the high fatigue environment, causing material fatigue.

To protect the integrity of the wing, holes in an AWT wing typically have seals over each hole or laminate the wires into the wing permanently. However, these options are not as good a maintaining a non-holed, sealed, or near-sealed wing structure. Embodiments described herein relate to providing a wiring harness for a wing of an AWT that can operate in a high material fatigue environment and that do not require holes in the wing. For instance, some implementations may involve a wiring harness with embedded wires, such as conductors and fiber-optic lines, attaching to a pocket in a wing to provide the required circuitry without requiring holes in the wing.

II. ILLUSTRATIVE SYSTEMS

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, forward flight, crosswind flight. In some implementations, the ground station 110 may be configured for use on land. In further implementations, the ground station may be configured for use on a body of water and may be configured as, or used in conjunction with, a floating off-shore platform or a boat, for example.

In addition, the ground station 110 may include one or more components (not shown), such as a winch, that may vary a length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters. The tether may be a faired tether comprising a wing shaped cross-section or may comprise a circular cross-section.

The aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8, etc.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight. The main wing 131 may further comprise a pocket or recessed channel portion for insertion of a harness that includes wiring, as will be described below.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced between the main wing 131. In some examples, a vertical spacing between corresponding rotors (e.g., rotor 134A and rotor 134B or rotor 134C and rotor 134D) may be 0.9 meters.

The rotors 134A-D may configured to drive one or more generators for the purpose of generating electrical energy. In this example, the rotors 134A-D may each include one or more blades, such as three blades. The one or more rotor blades may rotate via interactions with the wind and which could be used to drive the one or more generators. In addition, the rotors 134A-D may also be configured to provide a thrust to the aerial vehicle 130 during flight. With this arrangement, the rotors 134A-D may function as one or more propulsion units, such as a propeller. Although the rotors 134A-D are depicted as four rotors in this example, in other examples the aerial vehicle 130 may include any number of rotors, such as less than four rotors or more than four rotors.

The tail boom 135 may connect the main wing 131 to the tail wing 136. The tail boom 135 may have a variety of dimensions. For example, the tail boom 135 may have a length of 2 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it should be understood that the methods and systems described herein could involve any suitable aerial vehicle that is connected to a tether, such as the tether 120.

B. Illustrative Components of an AWT

Figure 2:
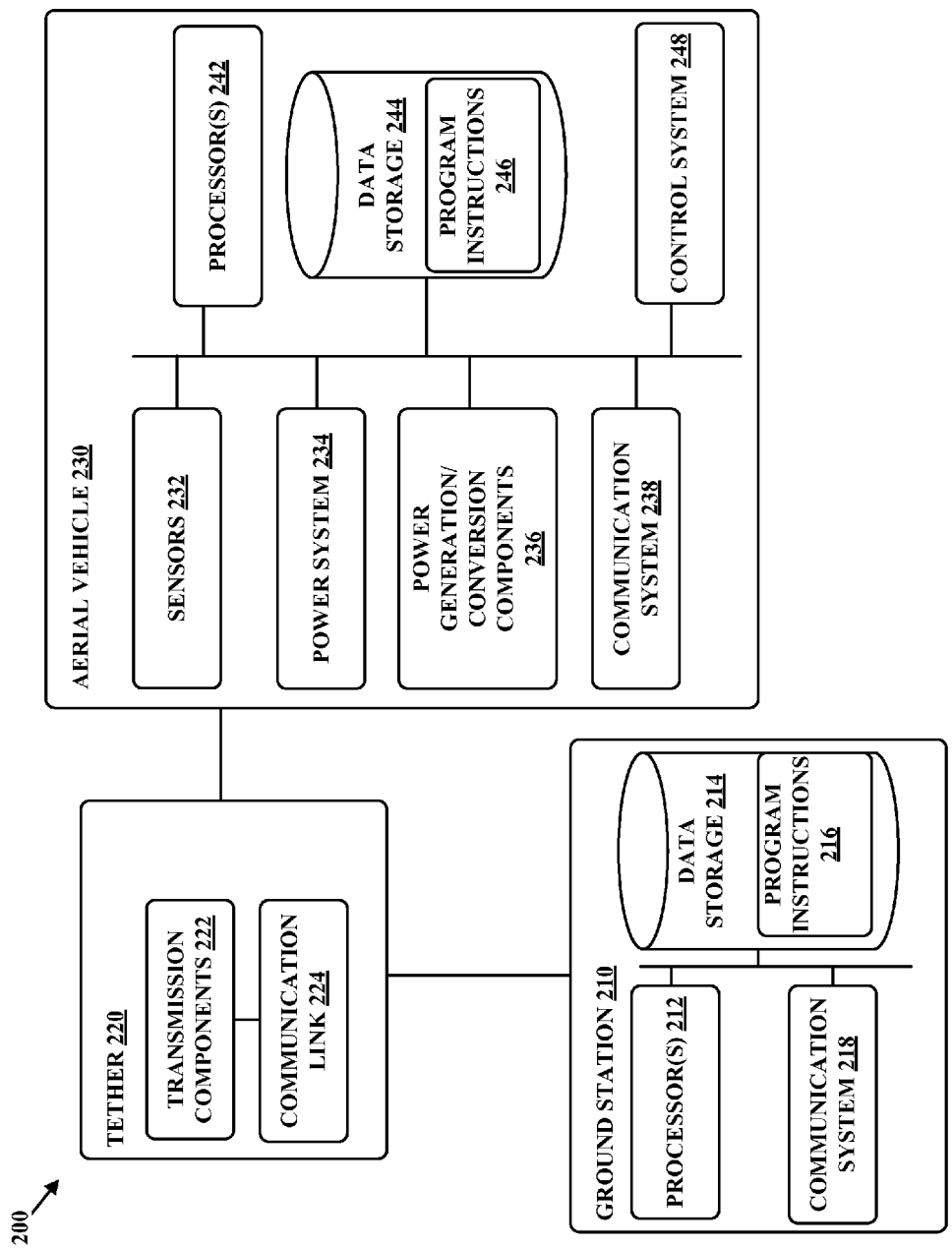
FIG. 2 is a simplified block diagram illustrating components of an AWT, according to an example embodiment.

FIG. 2 is a simplified block diagram illustrating components of the AWT 200. The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allow for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors configured to transmit electricity. And in at least one such example, the one or more conductors may include aluminum and/or any other material which allows for the conduction of electric current. Moreover, in some implementations, the transmission components 222 may surround a core of the tether 220 (not shown).

The ground station 210 may communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 326 could take various different forms in various different embodiments. For example, the power generation/conversion components 236 may include one or more generators, such as high-speed, direct-drive generators. With this arrangement, the one or more generators may be driven by one or more rotors, such as the rotors 134A-D. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 230 and/or the tether 120.

C. Illustrative Components of a Wiring Harness and Wing

Figure 3:
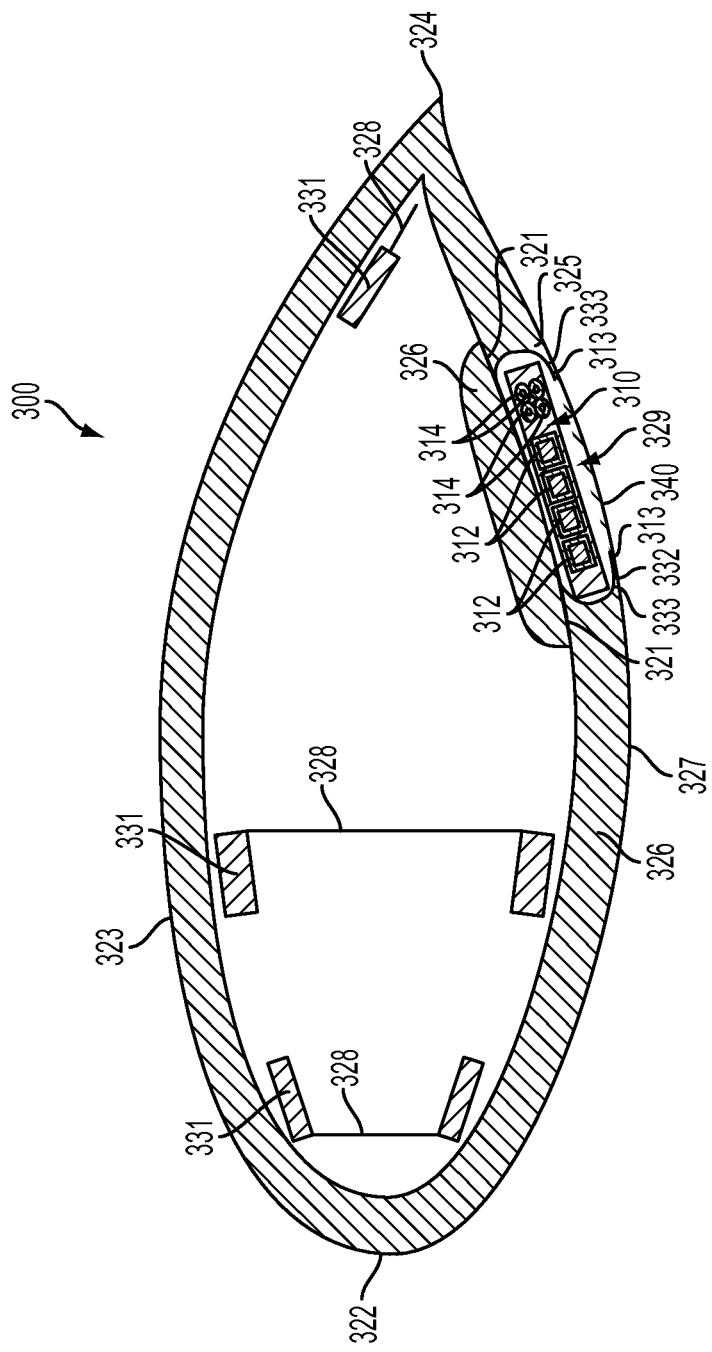
FIG. 3 depicts a cross-sectional view of a wing with a wiring harness, according to an example embodiment.

FIG. 3 depicts a cross-sectional view of a wing 300 with a wiring harness 310, according to an example embodiment. The wing 300 may take the form of or be similar to a wing of an aerial vehicle such as the aerial vehicle 130 or 230.

As shown in FIG. 3, the wing 300 may comprise a leading edge 322, an upper end 323, a trailing edge 324, a lower end 325, an inner skin 326, an outer skin 327, and a plurality of spars 328. A pocket 329 may be carved into the wing at or near the lower end 325.

The leading edge 322 is the part of the wing 300 that first contacts the wind. The wind travels along the surface of the wing 300, and leaves at the trailing edge 324.

The outer skin 327 is a layer of material that may cover the wing 300 to form an exterior surface of the wing 300. As shown in FIG. 3, the outer skin 327 is formed over the pocket 329 as well, so as to provide a continuous layer of the outer skin 327 on the wing 300. In some example embodiments, the outer skin 327 may comprise a composite, such as fiberglass, carbon fiber, and/or resin. Such a material allows for straight compression of the inner skin 326 without stressing the core of the wing 300, which does not handle stress well. By forming an exterior surface of the wing, the outer skin 327 is generally formed from a material that maintains the integrity of the wing 300, e.g., is resistant to corrosion and the like, when subjected to the environment.

The inner skin 326 may comprise a layer of material formed within an interior of the wing adjacent the outer skin 327. As shown in the cross-sectional view of FIG. 3, in an example embodiment, the inner skin 326 may continue around the interior of the wing 300 at the location of the pocket 329, so as to provide a continuous layer of the inner skin 326 beneath the outer skin 327 around the wing 300. Thus, the inner skin 326 may be formed adjacent to and around the portion of the outer skin 327 at the pocket.

In this example embodiment, the inner skin 326 is offset at the location of the pocket 329 from the other portions inner skin 326 that are not above the pocket 329 and thus some of the inner skin 326 is formed at a segment of the pocket 329 where the portion of the core of the wing has removed. The inner skin 326 may be reinforced with overlaps 321 at the points of offset to reduce load within the two layers of skin. The points of offset may include the edges 332 of the pocket 329. Providing a continuous layer of the inner skin 326 preserves buckling resistance and linear strength of the segment comprising the pocket. In some example embodiments, the inner skin 326 may comprise a foam, such as expanded polystyrene (EPS) or expanded polypropylene (EPP). Other materials for the inner skin may also be envisioned.

The spars 328 provide structural support to the wing 300, carrying the weight of the wing. The spars 328 may be formed of a solid material. In some example embodiments, the spars 328 may comprise a foam core. Spar caps 331 shaped in an "L" or "T" may be welded or riveted to the top and bottom of each spar 328 to prevent buckling under applied loads.

The pocket 329 comprises a space offset inwards from the exterior of the wing 300 at or near the lower end 325 of the wing. At least a portion of the core may be removed to form the pocket 329. The pocket 329 is sized and shaped to receive a wiring harness, which will be described in further detail below. In some example embodiments, the pocket 329 may be described as comprising a recessed channel in the wing 300. The pocket 329 may comprise a lip 333 at its edges 332 to hold a corresponding spring 313 of the wiring harness 310. The pocket 329 may be formed during a molding process to manufacture the wing 300. In some example embodiments, the pocket 329 may comprise a generally trapezoidal shape or a rectangular shape. Other shapes for the pocket may also be envisioned; the shape of the pocket may be designed to correspond with and receive the shape of the wiring harness 310.

Although the pocket 329 may be formed at any location on the exterior of the wing 300, forming the pocket 329 at or near the lower end 325 of the wing 300 may be advantageous because the lower end 325 is a point of low stress on the inner and outer skins 326, 327. The stress concentrations in the wing surface are generally the lowest over a survey of loads at the lower end 325. The lower end 325 is a point of low stress relative to other locations on the wing 300 as it is near the neutral axis on flapwise bending as well as the neutral axis on chordwise bending. In contrast, the upper end 323 is where lift is generally generated, and the upper end 323 thus experiences bending along both axes (e.g., Z and Y axes).

A cover 340 may be affixed to the outer skin 327. In the closed position, the cover 340 may span over or across the pocket 329 so as to cover the pocket and thus protect contents (e.g., the wiring harness 310) within the pocket 329. In some embodiments, the cover 340 is a hatch cover bonded over at least a portion of the wing 300 that may close across the pocket 329 to cover the wiring harness 310 within the pocket 329. Such a cover may help moisture from reaching the wiring harness 310, for example. In some example embodiments, however, no cover may be present. For example, if the wiring harness 310 is impervious to moisture absorption, there may be no need for a cover to protect the wiring harness from moisture in the environment.

The wiring harness 310 may be sized and shaped to fit within the pocket 329, as discussed above, and may be affixed to a portion of the outer skin 327 lining the pocket 329. In some example embodiments, the wiring harness 310 is removably attachable to the outer skin 327. The wiring harness 310 may include one or more springs 313 comprising a curved shape. The springs 313 may be present on a side of the wiring harness 310, and may be compressible to sit on top of the lip 333 of the pocket 329 to hold the wiring harness 310 in place within the pocket 329. In some example embodiments, the wiring harness 310 may comprise wiring such as power conductors 312 and/or fiber and low voltage connections 314. The wiring harness may also comprise connectors and plugs for attachment to pylons, as will be discussed in further detail below.

The wiring harness 310 as shown in FIG. 3 comprises a single piece. However, in some example embodiments, the wiring harness 310 may comprise two pieces (e.g., one piece may be for high voltage connections and a second piece may be for LV and communications). In an embodiment wherein the wiring harness comprises two pieces, a cover comprising a spring such as the springs 313 may snap or otherwise fit on top of the two pieces. Such a cover may comprise a molded cover. In other example embodiments, instead of a cover, a tape (e.g., a stretch formed tape or a flat tape) or a shroud other than a molded cover that encapsulates and unitizes the wiring harness pieces may be used.

In some example embodiments, the wiring harness 310 may be made from rubber using an injection molding process. During such an injection molding process, wiring and other connections may be molded into the wiring harness 310, thus preventing any flying leads from being formed on the harness. In some example embodiments, the wiring harness 310 may be co-molded with the wing 300 such that it is an integral part of and is not removable from the wing 300. In other example embodiments, the wiring harness 310 may be formed separately from the wing 300, allowing for the wiring harness 310 to then be removable from the wing 300. The removability of the wiring harness 310 may provide for a substitution with another wiring harness should the currently attached wiring harness show signs of fatigue in one or more of the wires or connections. Substituting a faulty wiring harness from a wing is likely cheaper than substituting an entire wing.

In other example embodiments, the wiring harness may be made using an extrusion process, wherein the connections may be spliced onto the wiring harness.

As discussed above, AWTs have both wiring requirements and operate in a high fatigue environment. Holes are typically formed through layers in the wing to provide for wiring to pass therethrough. Such holes allow for moisture to collect and sit. In a high heat environment where the wing operates like a turbine blade, moisture collection from such holes weakens the composite material of the wing, which can result in fatigue in the area surrounding the hole. Such fatigue may compromise the integrity and lifespan of the wing. The wing 300 and wiring harness 310 of FIG. 3 provide sufficient wiring and connections to power components associated with the wing 300, all the while keeping the outer skin 327 continuous and without holes.

Figure 4A:
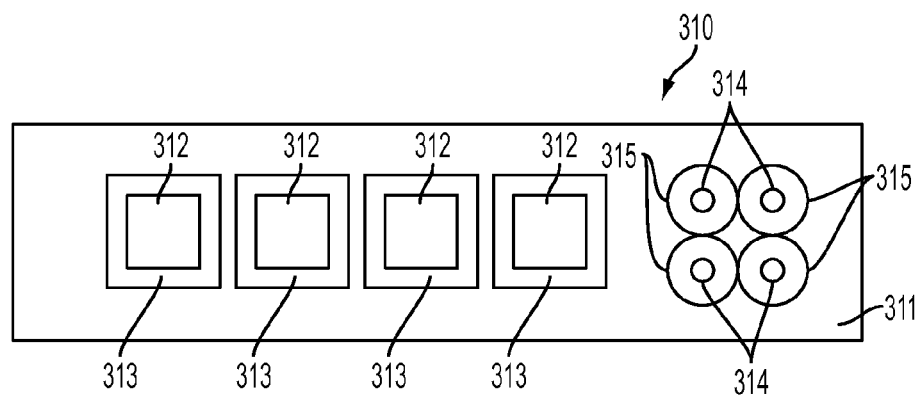
FIG. 4a depicts a detailed view of the wiring harness of FIG. 3, according to an example embodiment.

FIG. 4a depicts a detailed view of the cross-section of the wiring harness 310 of FIG. 3, according to an example embodiment. As shown in FIG. 4a, the wiring harness 310 may include a rubber body 311 and wiring. The wiring may comprise in one example embodiment one or more power conductors 312 surrounded by wire insulation 313, and one or more fiber-optic lines 314 that may also be surrounded by wire insulation 315. The term fiber-optic line as used herein may be used to describe a fiber-optic line alone, or may comprise a fiber-optic line surrounded by insulation (such as wire insulation 315, for example) or a number of other protective layers. Fiber-optic lines may comprise strands of glass or plastic fibers that function as a waveguide to transmit light between the two ends of the fiber. The wire insulations 313 and 315 may vary in thickness, and a thinner layer may be applied in some example embodiments as the wiring harness within which the power conductors 312 and the fiber-optic lines 314 are embedded also provides some protection. Although four conductors 312 and four fiber-optic lines 314 are shown in FIG. 4a, more or less of each may be formed as part of the wiring harness 310. In the embodiment shown in FIG. 4a, all wiring runs through one or two cables. The cables may comprise a flat ribbon cable. If two cables are used for the wiring harness 310, one cable may comprise an HV cable and the other cable may comprise an LV cable, in an example embodiment. The wiring may be built with a shallow pitch angle of a high elongation material, such as stranded copper or aluminum material to allow for stretch, or may be inserted into the wiring jacket in a non-straight path, for example, a pre-bent zigzag form. As the wing elongates, the wiring may then elongate.

Figure 4B:
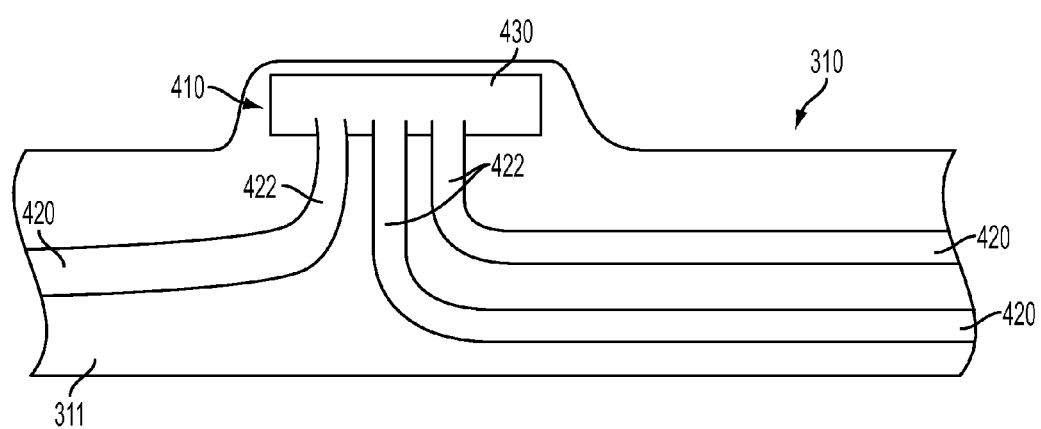
FIG. 4b depicts a cross-sectional view of a junction of a wiring harness, according to an example embodiment.

FIG. 4b depicts a junction 410 that may be present in the wiring harness 310 of FIG. 3, according to an example embodiment. Wiring 420 is shown extending through the harness 310. The wiring 420 may comprise power conductors and fiber-optic lines that may take the form as or be similar to the power conductors 312 and fiber-optic lines 314. The wiring may feed into a connector 430. The connector 430 may be made from a solder or crimp, in some example embodiments. As shown in FIG. 4b, the connector 430 may be made with right angle segments 422 of the wiring to provide for strain relief local to the connector 430.

Such a junction 410 may be embedded in the wiring harness 310 to keep the junction 410 isolated. Advantageously, such junctions 410 avoid having repeated wiring runs due to having all or a substantial number of connectors made at a particular location, such as at the center of the wing 300, for example.

Figure 4E:
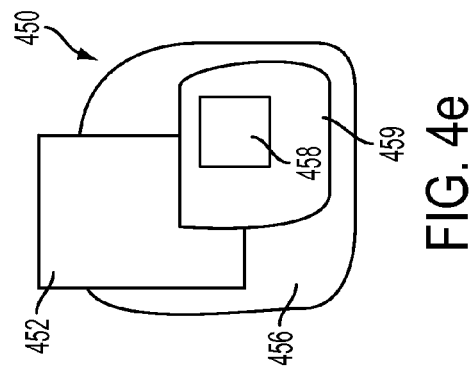
FIG. 4e depicts a front view of the connector of FIG. 4c, according to an example embodiment.
Figure 4D:
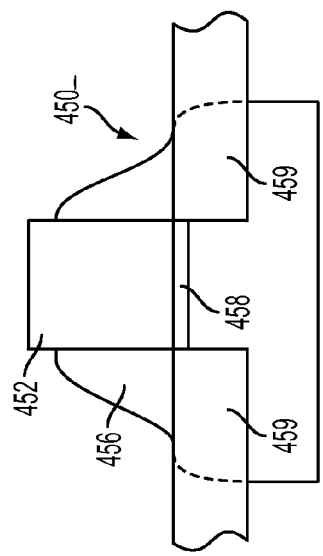
FIG. 4d depicts a side view of the connector of FIG. 4c, according to an example embodiment.
Figure 4C:
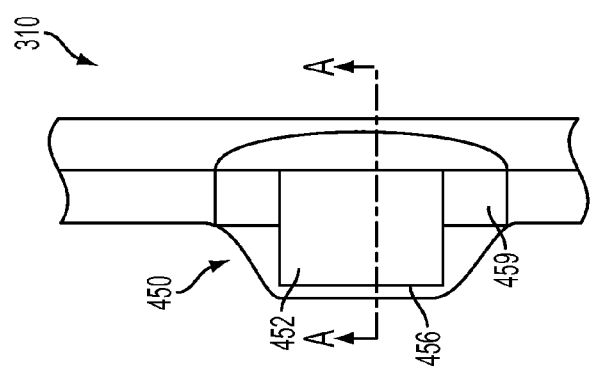
FIG. 4c depicts a cross-sectional top view of a connector of the wiring harness, according to an example embodiment.

FIGS. 4c-e depict views of a plug or connector configuration 450 that may be present in a wiring harness, such as the wiring harness 310 of FIG. 3, according to an example embodiment. In the top view depicted in FIG. 4c, a connector 452 is present and is surrounded by an insulation layer 456. The connector 452 may comprise an HV band plug in some example embodiments, and may be configured to receive a pylon. A wire (shown in FIGS. 4d-e as wire 458) covered in insulation 459 feeds into the connector 452.

The side view of the junction 450 is shown in FIG. 4d. As shown in FIG. 4d, the insulation 459 may be stripped from the wire 458 over a segment of the wire, exposing the segment of the wire 458 that feeds into the connector 452.

FIG. 4e depicts a front view of the junction 450 at cross-section A-A of FIG. 4c, depicting the placement of the connector 452, the insulation layer 456, and the wire 458. The insulation 459 around part of the wire 458 is also shown.

The connector 452 may be soldered or crimped onto the wire 458 prior to molding the wiring harness 310 in an embodiment in which the wiring harness 310 is injection molded. During the molding process, at least a portion of the connector 452 may be covered with a cap or filler to prevent overmolding the entire connector 452. The connector may be pre-treated to provide for a good bond with the molding material of the wiring harness 310. Thus, a connector may be built into the wiring harness, which may be advantageous. By recessing the majority of the connector 452 into the wiring harness 310, the connector 452 is more robust and hardened, which may reduce the need to replace a wiring harness due to mechanical manipulation of the connector during an attachment process, for example.

D. Systems for Providing Power

Figure 5:
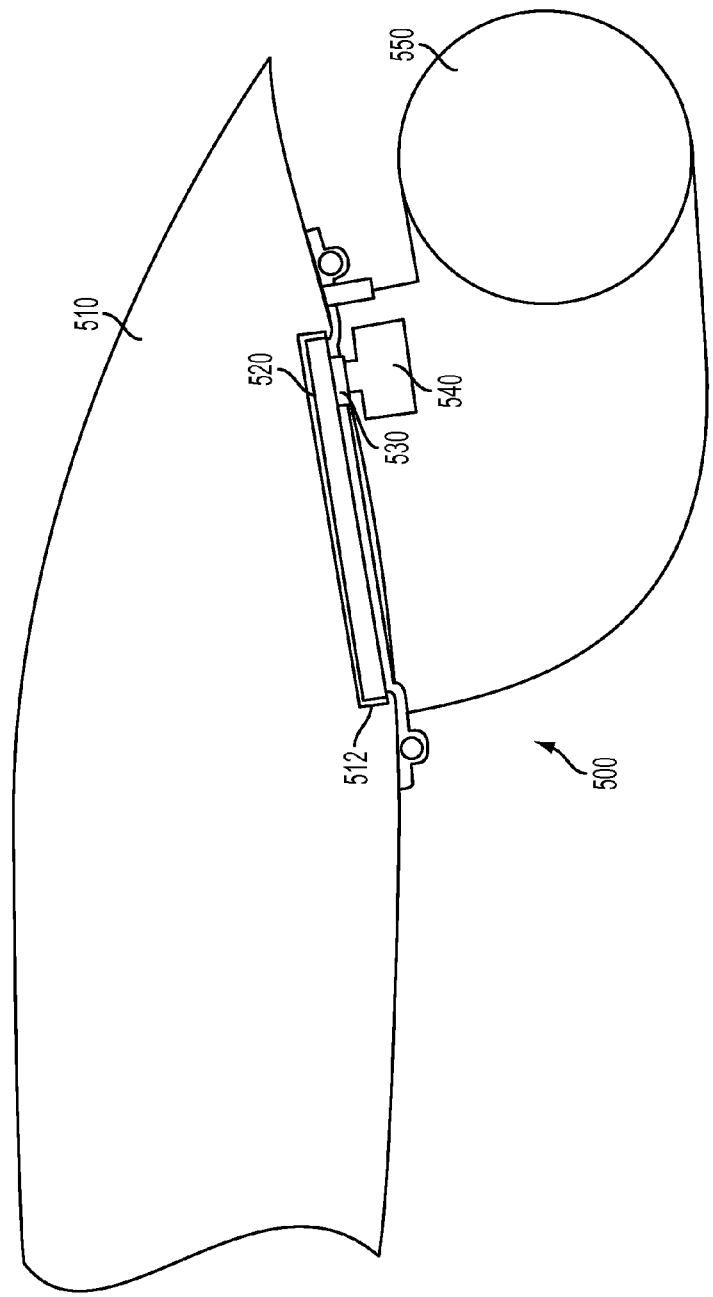
FIG. 5 depicts a system for providing power to a component, according to an example embodiment.

FIG. 5 depicts an example system 500 for providing power to a component. The system 500 includes a wing 510 with a wiring harness 520 comprising at least one plug 530, wherein the plug 530 is attached via a pylon 540 to a component 550.

The wing 510 may be part of an aerial vehicle such as the aerial vehicle 130 or 230. The wing 510 may be the main wing of the aerial vehicle, and may take the form of or be similar in form as the wing 300 of FIG. 3, and may include a pocket 512 for insertion of the wiring harness 520.

In the example embodiment of FIG. 5, the plug or connector 530 is configured for high voltage connections and applications. However, the same or a similar connector configuration may be used for fiber-optic and other connections requiring less voltage. The connector 530 may be built into and may thus be integral with the wiring harness 520, as described in the example embodiment of FIGS. 4c-e.

The pylon 540 may comprise any of a number of structures used to mount equipment, such as component 550, for example, externally on an AWT. The pylon 540 is configured to engage the connector 530. The pylon 540 may comprise a Fowler pylon in some example embodiments, that holds the trailing edge flaps of the main wing. In other example embodiments, the pylon 540 may comprise a motor pylon to which motors and propellers may attach. The pylon 540 may bolt onto the wing 510. The wiring harness 520 may connect power and communications for the pylon 540.

The component 550 may comprise any of a number of components to be attached to and powered by the wing, and as previously noted may be attachable to the pylon 540. The component may comprise a flange with bolts on or around the flange which attach to the wing 510.

The system of FIG. 5 illustrates another advantage to embedding the connector 530 in the wiring harness 520 during the molding process: by doing so, the connector 530 can be placed in a position on the wiring harness 520 with precision. The ability to precisely mold the connector 530 into the wiring harness 520 allows for the electrical connection to be made as the mechanical connection is made, without a two-step installation process. In some example embodiments, a mechanical alignment other than the electrical connector may be used to locate the mechanical bolt holes for attachment. In other example embodiments, the electrical connection may serve to locate the mechanical bolt holes. The pylon 540 (attached to the connector 530) may be placed over the wing 510 where bolts will go into the wing 510 as well. Because concurrent mechanical and electrical connections can be made, maintenance failure cases, such as those in which mechanical or electrical connections are made, but not both, may be avoided.

E. Method for Manufacturing a Wiring Harness

Figure 6:
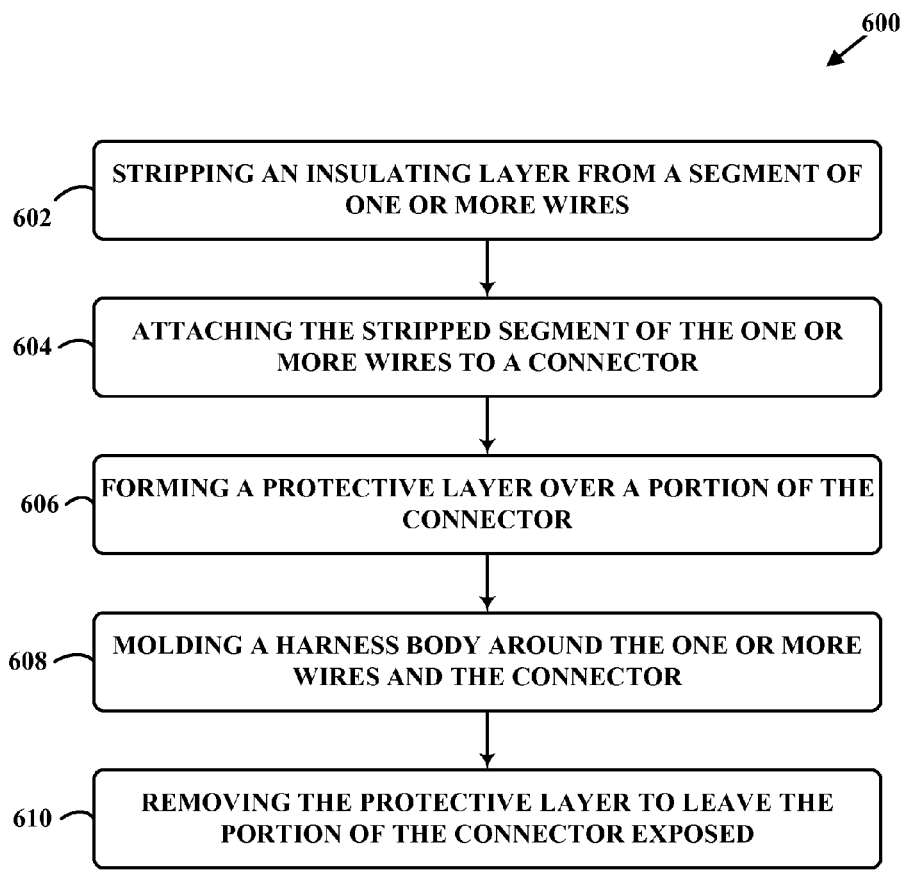
FIG. 6 is a method of manufacturing a wiring harness, according to an example embodiment.

FIG. 6 is a flowchart illustrating a method 600, according to an example embodiment. The method 600 may be used to manufacture a wiring harness.

As shown by block 602, the method 600 involves stripping an insulating layer from a segment of one or more wires. The wires may include power conductors and fiber-optic lines that may take the form as or be similar to the power conductors 312 and fiber-optic lines 314.

At block 604, the method 600 involves attaching the stripped segment of the one or more wires to a connector. The connector may take the form of or be similar in form to the connector 452. The attachment of the stripped segment may be performed such as described and shown with reference to FIGS. 4c-e.

At block 606, the method 600 involves forming a protective layer over a portion of the connector. The protective layer may comprise a cover such as a cap or filler. The connector may be pre-treated to provide for a good bond with the molding material of the wiring harness.

At block 608, the method 600 involves molding a harness body around the one or more wires and the connector. The protective layer may prevent overmolding the entire connector during the molding process.

The method 600 further involves removing the protective layer to leave the portion of the connector exposed, at block 610. The exposed connector may receive a pylon or a component.

III. CONCLUSION

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

The invention claimed is:

1. A wiring harness attached to a recessed section in a wing of an aerial vehicle comprising:
   a body;
   one or more wires embedded into a cable in the body; and
   one or more connectors partially embedded in the body and in communication with the one or more wires.

2. The wiring harness of claim 1, wherein the one or more wires comprises conductors and fiber-optic lines, each being surrounded by a layer of insulation.

3. The wiring harness of claim 2, wherein the one or more wires are further inserted into a molded cable, providing for more than one layer of insulation between the one or more wires and a ground.

4. The wiring harness of claim 1, wherein the body comprises rubber molded around the one or more wires and at least part of the one or more connectors, and wherein the one or more connectors is configured to receive a pylon.

5. The wiring harness of claim 1, wherein the embedded one or more wires follow a non-straight path and comprise a material capable of elongation.

6. The wiring harness of claim 1, wherein the one or more wires are bent at about a 90 degree angle and crimped to form a junction and the junction is embedded within the body.

7. The wiring harness of claim 1, the one or more wires further comprises a layer of insulation.

8. The wiring harness of claim 7, wherein a connector of the one or more connectors is attached to a wire of the one or more wires at a segment of the wire that is stripped of the layer of insulation.

9. A system comprising:
   an aerial vehicle comprising a wing, wherein the wing comprises a pocket formed as a recessed section of the wing; and
   a harness provided within the pocket, wherein the harness comprises:
   a body;
   one or more wires embedded into a cable in the body; and
   one or more connectors partially embedded in the body.

10. The system of claim 9, further comprising:
    an outer layer formed of a composite that forms an exterior surface of the wing, including the pocket;
    an inner layer formed within an interior of the wing adjacent the outer layer; and
    an inner core formed within the interior adjacent the inner layer;
    wherein the inner layer is formed around the portion of the outer layer at the pocket.

11. The system of claim 10, wherein at least a portion of the core is removed to form the pocket, further comprising:
    a portion of the inner layer formed at a segment of the pocket where the portion of the core is removed; and
    an overlapping portion of the inner layer around edges of the pocket such that the inner layer forms a continuous layer around the wing.

12. The system of claim 10, wherein the wiring harness that is provided within the pocket rests against the outer layer.

13. The system of claim 9, wherein edges of the pocket further comprise a lip, and wherein the harness further comprises a spring to rest in a compressed form on top of the lip when the harness is within the pocket.

14. The system of claim 9, wherein the pocket is formed at a low elongation point of the outer layer of the wing where stress concentrations are lower relative to the other portions of the wings.

15. The system of claim 9, the wing further comprising a cover that spans the pocket in a closed position.

\* \* \* \* \*